(12) United States Patent
Misino et al.

(10) Patent No.: US 11,015,106 B2
(45) Date of Patent: May 25, 2021

(54) REUSABLE HIGH PERFORMANCE WATER BASED DRILLING FLUIDS

(71) Applicant: Weatherford Technology Holdings, LLC, Houston, TX (US)

(72) Inventors: César Misino, Rio de Janeiro (BR); Luc Leoni, Rio de Janeiro (BR); Shaohua Lu, Houston, TX (US); Gaston Wray Curtis, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

(21) Appl. No.: 16/824,822

(22) Filed: Mar. 20, 2020

(65) Prior Publication Data

US 2020/0216740 A1 Jul. 9, 2020

Related U.S. Application Data

(62) Division of application No. 14/506,137, filed on Oct. 3, 2014, now Pat. No. 10,669,468.

(60) Provisional application No. 61/888,325, filed on Oct. 8, 2013.

(51) Int. Cl.
*C09K 8/28* (2006.01)
*E21B 7/00* (2006.01)
*C09K 8/08* (2006.01)
*C09K 8/26* (2006.01)

(52) U.S. Cl.
CPC .............. *C09K 8/28* (2013.01); *C09K 8/08* (2013.01); *C09K 8/26* (2013.01); *E21B 7/00* (2013.01); *C09K 2208/12* (2013.01)

(58) Field of Classification Search
None
See application file for complete search history.

(56) References Cited

U.S. PATENT DOCUMENTS

| | | |
|---|---|---|
| 2,196,042 A | 4/1940 | Timpson |
| 2,390,153 A | 12/1945 | Kern |
| 2,805,958 A | 9/1957 | Bueche et al. |
| 3,059,909 A | 10/1962 | Wise |
| 3,163,219 A | 12/1964 | Wyant et al. |
| 3,301,723 A | 1/1967 | Chrisp |
| 3,301,848 A | 1/1967 | Halleck |
| 3,303,896 A | 2/1967 | Tillotson et al. |
| 3,317,430 A | 5/1967 | Priestly et al. |
| 3,565,176 A | 2/1971 | Wittenwyler |
| 3,856,921 A | 12/1974 | Shrier et al. |
| 3,888,312 A | 6/1975 | Tiner et al. |
| 3,933,205 A | 1/1976 | Kiel |
| 3,937,283 A | 2/1976 | Blauer et al. |
| 3,960,736 A | 6/1976 | Free et al. |
| 3,965,982 A | 6/1976 | Medlin |
| 3,990,978 A | 11/1976 | Hill |
| 4,007,792 A | 2/1977 | Meister |
| 4,052,159 A | 10/1977 | Fuerst et al. |
| 4,057,509 A * | 11/1977 | Costanza ............... C10L 7/02 516/107 |
| 4,067,389 A | 1/1978 | Savins |
| 4,108,782 A | 8/1978 | Thompson |
| 4,112,050 A | 9/1978 | Sartori et al. |
| 4,112,051 A | 9/1978 | Sartori et al. |
| 4,112,052 A | 9/1978 | Sartori et al. |
| 4,113,631 A | 9/1978 | Thompson |
| 4,378,845 A | 4/1983 | Medlin et al. |
| 4,385,935 A | 5/1983 | Skjeldal |
| 4,461,716 A | 7/1984 | Barbarin et al. |
| 4,479,041 A | 10/1984 | Fenwick et al. |
| 4,506,734 A | 3/1985 | Nolte |
| 4,514,309 A | 4/1985 | Wadhwa |
| 4,541,935 A | 9/1985 | Constien et al. |
| 4,549,608 A | 10/1985 | Stowe et al. |
| 4,561,985 A | 12/1985 | Glass, Jr. |
| 4,623,021 A | 11/1986 | Stowe |
| 4,654,266 A | 3/1987 | Kachnik |
| 4,657,081 A | 4/1987 | Hodge |
| 4,660,643 A | 4/1987 | Perkins |
| 4,683,068 A | 7/1987 | Kucera |
| 4,686,052 A | 8/1987 | Baranet et al. |

(Continued)

FOREIGN PATENT DOCUMENTS

| | | |
|---|---|---|
| CA | 2125513 A1 | 1/1995 |
| DE | 4027300 A1 | 3/1992 |

(Continued)

OTHER PUBLICATIONS

PCT International Search Report and Written Opinion dated Feb. 13, 2015, for International Application No. PCT/IB2014/065110.

*Primary Examiner* — John J Figueroa

(74) *Attorney, Agent, or Firm* — Patterson + Sheridan, LLP

(57) ABSTRACT

A method for drilling a borehole includes, while drilling, circulating a fluid composition. The fluid composition includes an aqueous continuous phase comprising an additive composition, the additive composition comprising an amphoteric polymer, a polyacrylamide, or a combination thereof; and an organic internal phase comprising a glycerol, a polyglycerol, a poly hydroxyl alcohol, a monosaccharide derivative, a polysaccharide derivative, or a combination thereof. In one embodiment, the additive composition includes a salt up to saturation and at least one of an amphoteric polymer or a polyacrylamide. In another embodiment, the additive composition includes a hydratable polymer, and an amphoteric polymer.

20 Claims, No Drawings

(56) References Cited

U.S. PATENT DOCUMENTS

| | | |
|---|---|---|
| 4,695,389 A | 9/1987 | Kubala |
| 4,705,113 A | 11/1987 | Perkins |
| 4,714,115 A | 12/1987 | Uhri |
| 4,718,490 A | 1/1988 | Uhri |
| 4,724,905 A | 2/1988 | Uhri |
| 4,725,372 A | 2/1988 | Teot et al. |
| 4,739,834 A | 4/1988 | Peiffer et al. |
| 4,741,401 A | 5/1988 | Walles et al. |
| 4,748,011 A | 5/1988 | Baize |
| 4,779,680 A | 10/1988 | Sydansk |
| 4,780,220 A | 10/1988 | Peterson |
| 4,795,574 A | 1/1989 | Syrinek et al. |
| 4,817,717 A | 4/1989 | Jennings, Jr. et al. |
| 4,830,106 A | 5/1989 | Uhri |
| 4,846,277 A | 7/1989 | Khalil et al. |
| 4,848,468 A | 7/1989 | Hazlett et al. |
| 4,852,650 A | 8/1989 | Jennings, Jr. et al. |
| 4,869,322 A | 9/1989 | Vogt, Jr. et al. |
| 4,892,147 A | 1/1990 | Jennings, Jr. et al. |
| 4,926,940 A | 5/1990 | Stromswold |
| 4,938,286 A | 7/1990 | Jennings, Jr. |
| 4,978,512 A | 12/1990 | Dillon |
| 5,005,645 A | 4/1991 | Jennings, Jr. et al. |
| 5,024,276 A | 6/1991 | Borchardt |
| 5,067,556 A | 11/1991 | Fudono et al. |
| 5,074,359 A | 12/1991 | Schmidt |
| 5,074,991 A | 12/1991 | Weers |
| 5,076,373 A | 12/1991 | Hale et al. |
| 5,082,579 A | 1/1992 | Dawson |
| 5,106,518 A | 4/1992 | Cooney et al. |
| 5,110,486 A | 5/1992 | Manalastas et al. |
| 5,169,411 A | 12/1992 | Weers |
| 5,198,416 A * | 3/1993 | Hale ............ C09K 8/36 507/136 |
| 5,224,546 A | 7/1993 | Smith et al. |
| 5,228,510 A | 7/1993 | Jennings, Jr. et al. |
| 5,246,073 A | 9/1993 | Sandiford et al. |
| 5,259,455 A | 11/1993 | Nimerick et al. |
| 5,330,005 A | 7/1994 | Card et al. |
| 5,342,530 A | 8/1994 | Aften et al. |
| 5,347,004 A | 9/1994 | Rivers et al. |
| 5,363,919 A | 11/1994 | Jennings, Jr. |
| 5,402,846 A | 4/1995 | Jennings, Jr. et al. |
| 5,411,091 A | 5/1995 | Jennings, Jr. |
| 5,424,284 A | 6/1995 | Patel et al. |
| 5,439,055 A | 8/1995 | Card et al. |
| 5,462,721 A | 10/1995 | Pounds et al. |
| 5,465,792 A | 11/1995 | Dawson et al. |
| 5,472,049 A | 12/1995 | Chaffee et al. |
| 5,482,116 A | 1/1996 | El-Rabaa et al. |
| 5,488,083 A | 1/1996 | Kinsey, III et al. |
| 5,497,831 A | 3/1996 | Hainey et al. |
| 5,501,275 A | 3/1996 | Card et al. |
| 5,539,044 A | 7/1996 | Dindi et al. |
| 5,551,516 A | 9/1996 | Norman et al. |
| 5,562,160 A * | 10/1996 | Brannon ............ C09K 8/685 166/250.1 |
| 5,624,886 A | 4/1997 | Dawson et al. |
| 5,635,458 A | 6/1997 | Lee et al. |
| 5,649,596 A | 7/1997 | Jones et al. |
| 5,669,447 A | 9/1997 | Walker et al. |
| 5,674,377 A | 10/1997 | Sullivan, III et al. |
| 5,686,396 A | 11/1997 | Hale et al. |
| 5,688,478 A | 11/1997 | Pounds et al. |
| 5,693,837 A | 12/1997 | Smith et al. |
| 5,711,396 A | 1/1998 | Joerg et al. |
| 5,722,490 A | 3/1998 | Ebinger |
| 5,744,024 A | 4/1998 | Sullivan, III et al. |
| 5,755,286 A | 5/1998 | Ebinger |
| 5,775,425 A | 7/1998 | Weaver et al. |
| 5,787,986 A | 8/1998 | Weaver et al. |
| 5,806,597 A | 9/1998 | Tjon-Joe-Pin et al. |
| 5,807,812 A | 9/1998 | Smith et al. |
| 5,833,000 A | 11/1998 | Weaver et al. |
| 5,853,048 A | 12/1998 | Weaver et al. |
| 5,871,049 A | 2/1999 | Weaver et al. |
| 5,877,127 A | 3/1999 | Card et al. |
| 5,908,073 A | 6/1999 | Nguyen et al. |
| 5,908,814 A | 6/1999 | Patel et al. |
| 5,964,295 A | 10/1999 | Brown et al. |
| 5,979,557 A | 11/1999 | Card et al. |
| 5,980,845 A | 11/1999 | Cherry |
| 6,001,887 A | 12/1999 | Keup et al. |
| 6,016,871 A | 1/2000 | Burts, Jr. |
| 6,022,833 A * | 2/2000 | Mueller ............ C09K 3/00 175/66 |
| 6,035,936 A | 3/2000 | Whalen |
| 6,047,772 A | 4/2000 | Weaver et al. |
| 6,054,417 A | 4/2000 | Graham et al. |
| 6,059,034 A | 5/2000 | Rickards et al. |
| 6,060,436 A | 5/2000 | Snyder et al. |
| 6,063,972 A | 5/2000 | Duncum et al. |
| 6,069,118 A | 5/2000 | Hinkel et al. |
| 6,123,394 A | 9/2000 | Jeffrey |
| 6,133,205 A | 10/2000 | Jones |
| 6,147,034 A | 11/2000 | Jones et al. |
| 6,162,449 A | 12/2000 | Maier et al. |
| 6,162,766 A | 12/2000 | Muir et al. |
| 6,169,058 B1 | 1/2001 | Le et al. |
| 6,228,812 B1 | 5/2001 | Dawson et al. |
| 6,247,543 B1 | 6/2001 | Patel et al. |
| 6,267,938 B1 | 7/2001 | Warrender et al. |
| 6,283,212 B1 | 9/2001 | Hinkel et al. |
| 6,291,405 B1 | 9/2001 | Lee et al. |
| 6,330,916 B1 | 12/2001 | Rickards et al. |
| 6,725,931 B2 | 4/2004 | Nguyen et al. |
| 6,756,345 B2 | 6/2004 | Pakulski et al. |
| 6,793,018 B2 | 9/2004 | Dawson et al. |
| 6,832,650 B2 | 12/2004 | Nguyen et al. |
| 6,875,728 B2 | 4/2005 | Gupta et al. |
| 7,055,628 B2 | 6/2006 | Grainger et al. |
| 7,186,353 B2 | 3/2007 | Novak |
| 7,268,100 B2 | 9/2007 | Kippie et al. |
| 7,350,579 B2 | 4/2008 | Gatlin et al. |
| 7,392,847 B2 | 7/2008 | Gatlin et al. |
| 7,517,447 B2 | 4/2009 | Gatlin |
| 7,565,933 B2 | 7/2009 | Kippie et al. |
| 7,566,686 B2 | 7/2009 | Kippie et al. |
| 7,700,702 B2 | 4/2010 | Gaillard et al. |
| 7,712,535 B2 | 5/2010 | Venditto et al. |
| 7,767,628 B2 | 8/2010 | Kippie et al. |
| 7,829,510 B2 | 11/2010 | Gatlin et al. |
| 7,886,824 B2 | 2/2011 | Kakadjian et al. |
| 7,915,203 B2 | 3/2011 | Falana et al. |
| 7,932,214 B2 | 4/2011 | Zamora et al. |
| 7,942,201 B2 | 5/2011 | Ekstrand et al. |
| 7,956,017 B2 | 6/2011 | Gatlin et al. |
| 7,956,217 B2 | 6/2011 | Falana et al. |
| 7,971,659 B2 | 7/2011 | Gatlin et al. |
| 7,989,404 B2 | 8/2011 | Kakadjian et al. |
| 7,992,653 B2 | 8/2011 | Zamora et al. |
| 8,011,431 B2 | 9/2011 | van Petegem et al. |
| 8,028,755 B2 | 10/2011 | Darnell et al. |
| 8,034,750 B2 | 10/2011 | Thompson et al. |
| 8,084,401 B2 | 12/2011 | Lukocs et al. |
| 8,093,431 B2 | 1/2012 | Falana et al. |
| 8,097,567 B2 | 1/2012 | Wilson, Jr. |
| 8,141,661 B2 | 3/2012 | Kakadjian et al. |
| 8,158,562 B2 | 4/2012 | Wilson, Jr. et al. |
| 8,172,952 B2 | 5/2012 | Wanner et al. |
| 8,220,546 B2 | 7/2012 | Kakadjian et al. |
| 8,258,339 B2 | 9/2012 | Falana et al. |
| 8,273,693 B2 | 9/2012 | Schwartz |
| 8,287,640 B2 | 10/2012 | Zamora et al. |
| 8,362,298 B2 | 1/2013 | Falana et al. |
| 8,466,094 B2 | 6/2013 | Kakadjian et al. |
| 8,475,585 B2 | 7/2013 | Zamora et al. |
| 8,507,412 B2 | 8/2013 | Lukocs et al. |
| 8,507,413 B2 | 8/2013 | Wilson, Jr. |
| 8,524,639 B2 | 9/2013 | Falana et al. |
| 8,530,394 B2 | 9/2013 | Gatlin |
| 8,563,481 B2 | 10/2013 | Gatlin et al. |
| 8,714,283 B2 | 5/2014 | Gatlin et al. |
| 8,728,989 B2 | 5/2014 | Kakadjian, Sr. et al. |

(56) References Cited

U.S. PATENT DOCUMENTS

| | | |
|---|---|---|
| 8,772,203 B2 | 7/2014 | Schwartz |
| 8,835,364 B2 | 9/2014 | Thompson et al. |
| 8,841,240 B2 | 9/2014 | Kakadjian et al. |
| 8,846,585 B2 | 9/2014 | Falana et al. |
| 8,851,174 B2 | 10/2014 | Zamora et al. |
| 8,871,694 B2 | 10/2014 | Kakadjian et al. |
| 8,899,328 B2 | 12/2014 | Zamora et al. |
| 8,932,996 B2 | 1/2015 | Falana et al. |
| 8,944,164 B2 | 2/2015 | Veldman et al. |
| 8,946,130 B2 | 2/2015 | Zamora et al. |
| 8,950,493 B2 | 2/2015 | van Petegem et al. |
| 2002/0049256 A1 | 4/2002 | Bergeron |
| 2002/0165308 A1 | 11/2002 | Kinniard et al. |
| 2003/0114316 A1* | 6/2003 | Patel ............. C09K 8/36 507/138 |
| 2003/0176293 A1 | 9/2003 | Schilling et al. |
| 2003/0220204 A1 | 11/2003 | Baran et al. |
| 2005/0045330 A1 | 3/2005 | Nguyen et al. |
| 2005/0092489 A1 | 5/2005 | Welton et al. |
| 2005/0137114 A1 | 6/2005 | Gatlin et al. |
| 2009/0078419 A1* | 3/2009 | Dusterhoft ........ C09K 8/506 166/295 |
| 2010/0252262 A1 | 10/2010 | Ekstrand et al. |
| 2010/0305010 A1 | 12/2010 | Falana et al. |
| 2010/0311620 A1 | 12/2010 | Kakadjian et al. |
| 2010/0326658 A1* | 12/2010 | Milne ............... C09K 8/602 166/295 |
| 2011/0001083 A1 | 1/2011 | Falana et al. |
| 2011/0011645 A1* | 1/2011 | Muller ............... C08G 63/48 175/57 |
| 2011/0177982 A1 | 7/2011 | Ekstrand et al. |
| 2011/0240131 A1 | 10/2011 | Parker |
| 2012/0061086 A1 | 3/2012 | Willberg et al. |
| 2012/0071367 A1 | 3/2012 | Falana et al. |
| 2012/0073813 A1 | 3/2012 | Zamora et al. |
| 2012/0097893 A1 | 4/2012 | Wanner et al. |
| 2012/0273206 A1 | 11/2012 | Zamora et al. |
| 2012/0279727 A1 | 11/2012 | Kakadjian et al. |
| 2012/0295820 A1 | 11/2012 | Falana et al. |
| 2012/0302468 A1 | 11/2012 | Falana et al. |
| 2012/0325329 A1 | 12/2012 | Schwartz |
| 2013/0081820 A1 | 4/2013 | Falana et al. |
| 2013/0096038 A1 | 4/2013 | Kim et al. |
| 2013/0130947 A1 | 5/2013 | Brannon et al. |
| 2013/0175477 A1 | 7/2013 | Falana et al. |
| 2013/0270012 A1 | 10/2013 | Kakadjian et al. |
| 2013/0274151 A1 | 10/2013 | Kakadjian et al. |
| 2013/0303412 A1* | 11/2013 | Luyster ............. C09K 8/12 507/236 |
| 2013/0312977 A1 | 11/2013 | Lembcke et al. |
| 2013/0331301 A1 | 12/2013 | Falana et al. |
| 2014/0087977 A1 | 3/2014 | Kim et al. |
| 2014/0128294 A1 | 5/2014 | Gatlin et al. |
| 2014/0128308 A1 | 5/2014 | Levey et al. |
| 2014/0166285 A1 | 6/2014 | Santra et al. |
| 2014/0262287 A1 | 9/2014 | Treybig et al. |
| 2014/0262319 A1 | 9/2014 | Treybig et al. |
| 2014/0303048 A1 | 10/2014 | Kakadjian et al. |
| 2014/0315763 A1 | 10/2014 | Kakadjian et al. |
| 2014/0318793 A1 | 10/2014 | van Petergem et al. |
| 2014/0318795 A1 | 10/2014 | Thompson, Sr. et al. |
| 2014/0323360 A1 | 10/2014 | Comarin et al. |
| 2014/0323361 A1 | 10/2014 | Livanec et al. |
| 2014/0323362 A1 | 10/2014 | Falana et al. |
| 2015/0007989 A1 | 1/2015 | Tan et al. |
| 2015/0011440 A1 | 1/2015 | Zamora et al. |
| 2015/0051311 A1 | 2/2015 | Zamora et al. |
| 2015/0068747 A1 | 3/2015 | Hwang et al. |
| 2015/0072901 A1 | 3/2015 | Samuel et al. |
| 2015/0087561 A1 | 3/2015 | Falana et al. |
| 2015/0087562 A1 | 3/2015 | Falana et al. |
| 2015/0203742 A1 | 7/2015 | Reddy et al. |
| 2016/0145487 A1 | 5/2016 | Alam et al. |

FOREIGN PATENT DOCUMENTS

| | | | |
|---|---|---|---|
| GB | 775376 A | 5/1957 | |
| GB | 1073338 A | 6/1967 | |
| GB | 2216574 A | 10/1989 | |
| JP | 08151422 | 6/1996 | |
| JP | 10001461 | 1/1998 | |
| JP | 10110115 | 4/1998 | |
| JP | 2005194148 A | 7/2005 | |
| WO | 9856497 A1 | 12/1998 | |
| WO | 2000043465 A1 | 7/2000 | |
| WO | 2009141308 A1 | 11/2009 | |
| WO | WO-2010087732 A1 * | 8/2010 | ............. C09K 8/44 |

* cited by examiner

REUSABLE HIGH PERFORMANCE WATER BASED DRILLING FLUIDS

CROSS-REFERENCE TO RELATED APPLICATIONS

This application is a divisional of co-pending U.S. patent application Ser. No. 14/506,137, filed Oct. 3, 2014, which claims the benefit of United Application Ser. No. 61/888,325, filed Oct. 8, 2013, each of which is incorporated by reference herein in its entirety.

BACKGROUND

1. Field

Embodiments of this present disclosure generally relate to reusable high performance water based drilling fluids and methods of using water based drilling fluids.

In particular, embodiments of this invention relates to reusable high performance water based drilling fluids, and methods of use thereof, where the fluids include a water based continuous aqueous phase and discontinuous non-aqueous phase, where the aqueous phase is a brine and the non-aqueous phase is composed of glycerols, polyglycerols, poly hydroxyl alcohols, poly hydroxyl alcohols, monosaccharide derivatives, polysaccharide derivatives, or mixtures and combinations thereof.

2. Description of the Related Art

Oil based drilling fluids have historically been the preferred choice for exploration and development of drilling projects. These fluids are often reused from well to well and guarantee among other things: reasonable costs, good inhibiting properties, and good lubricity properties. Against these advantages, there are several disadvantages including high environmental impact such as spillage risks, significant cuttings disposal costs and location remedial costs. These fluids also entail logistics issues in moving large volumes of organic base fluids and salts, increased costs on solids control equipments and an undesirable dependency on the type of organic base fluids chosen for a given project.

Many principles have been addressed to control shale hydration due to drilling fluids used in the oil industry. Some of these control technologies include the use of lime and gypsum calcic fluids, salts dissolved in the aqueous phase up to saturation, silicate fluids, shale encapsulating polymers, amines, amphoteric polymers, inverted emulsion fluids, pore pressure transmission blocking mechanisms, glycol based fluids and many intermediate combinations of the above. Most fluids are based on one principle and often fail to address geological conditions and environmental regulation.

Historically, water based fluids have been a one interval disposable volume. Thus, there is a need in the art for reusable high performance water based drilling fluids.

SUMMARY

In an embodiment is provided a method for drilling a borehole comprising circulating, e.g., in the borehole, a composition. The composition includes an aqueous continuous phase comprising an additive composition, the additive composition comprising an amphoteric polymer, a polyacrylamide, or a combination thereof; and an organic internal phase comprising a glycerol, a polyglycerol, a poly hydroxyl alcohol, a monosaccharide derivative, a polysaccharide derivative, or a combination thereof.

In another embodiment is provided a method for drilling a borehole comprising circulating, e.g., in the borehole, a composition. The composition includes an aqueous continuous phase comprising an additive composition, the additive composition comprising a salt up to saturation and at least one of an amphoteric polymer or a polyacrylamide; and an organic internal phase comprises a glycerol, a polyglycerol, a poly hydroxyl alcohol, a monosaccharide derivative, a polysaccharide derivative, or a combination thereof.

In another embodiment is provided a method for drilling a borehole comprising circulating, e.g., in the borehole, a composition. The composition includes an aqueous continuous phase comprising an additive composition, the additive composition comprising a salt up to saturation, a hydratable polymer, and an amphoteric polymer; and an organic internal phase comprising a glycerol, a polyglycerol, a poly hydroxyl alcohol, a monosaccharide derivative, a polysaccharide derivative, or a combination thereof.

In another embodiment is provided different inhibition mechanisms to cope with reactive formations such as a formation including swellable clays. The present compositions emulate oil based fluids by having an organic internal phase, which creates an osmotic membrane. The osmotic membrane allows hydration-dehydration mechanisms to be in place and control interactions between the formation and the fluid. The non-aqueous phase, on the inhibition side, comprises or is composed of glycerols, polyglycerols, poly hydroxyl alcohols, monosaccharide derivatives, polysaccharide derivatives, or mixtures and combinations thereof, while the aqueous phase contains ingredients to impart different inhibiting mechanisms to the overall composition, where the ingredients and/or mechanisms include, without limitation, amphoteric polymers, potassium and/or sodium salts of up to saturation and/or polyacrylamides. In certain embodiments, the compositions may also include silicates. The compositions of this invention allow the drilled cuttings to travel up the annular gap, avoiding dissolution. Also fluid dilution is minimized. Pore pressure transmission blocking mechanisms are present in the fluids enhancing well stability and widening the pressure window between hydrostatic pressure and fracture gradient. The fluids have low environmental impact, which will save on solids control equipment requirements and will minimize disposal and remedial costs.

In another embodiment is provided methods for making or preparing compositions of this present disclosure.

In another embodiment is provided provide reusable high performance water based drilling fluids and other reusable high performance water based downhole fluids having low toxicity and reduced environmental impact. This reduces operating costs by improving material logistics and providing high drilling performance to operators.

DETAILED DESCRIPTION

The inventors have found that a reusable high performance water based fluids may be formulated having a full range of densities. The reusable high performance water based fluids include a continuous aqueous phase and a discontinuous organic or non-aqueous phase forming an osmotic membrane. The aqueous phase comprises a brine having certain controlled properties and the non-aqueous phase comprises glycerols, polyglycerols, poly hydroxyl alcohols, monosaccharide derivatives, polysaccharide derivatives, or mixtures and combinations thereof. The term reusable, in the context of oil-based drilling muds or fluids, means that when a particular drilling job is finished or completed, the mud or drilling fluid may be stored in tanks until it is needed for drilling another well. The fluids of the present disclosure remain complete, high performance water based drilling fluids that may be used over and over again for drilling. The drilling fluids of the present disclosure, therefore, are capable of being used from job to job, with make-up fluid volume being added as needed and drilling fluid treatments made to the drilling fluids of the present disclosure to maintain, modify, and/or alter desired fluid properties.

The inventors have found that by using a storage facility nearby the location in between jobs, the water based fluid may be rendered reusable. The present fluids will reduce liability for environmental integrated projects.

The inventors have also found that reusable high performance water based fluids may be formulated having density over a wide density range. In certain embodiments, the density of the fluids ranges between about 8.6 ppg and one 20 ppg and the fluids may be formulated for both low, moderate, and high temperature applications. In certain embodiments, the density of the fluids is between about 8.6 ppg and 18 ppg. In other embodiments, the density of the fluids is between about 8.6 ppg and 16 ppg. In other embodiments, the density of the fluids is between about 8.6 ppg and 14 ppg. In other embodiments, the density of the fluids is between about 8.6 ppg and 12 ppg. In other embodiments, the density of the fluids is between about 8.6 ppg and 10 ppg. The term "ppg" will be herein understood to mean "pounds per gallon".

Multi-functional additives have been developed that improve drilling fluid lubricity as well as a penetration rate and improve inhibiting properties of reactive shale. The new additives have been used at various volume % (vol. %) concentrations, based on the total fluid composition, e.g., drilling fluid composition, in formulations having varying densities. In certain embodiments, the concentration is at least 5% by volume. In certain embodiments, the concentration is at least 10% by volume. In certain embodiments, the concentration is at least 16% by volume. In certain embodiments, the concentration is at least 18% by volume. In certain embodiments, the concentration is up to 20% by volume.

In certain embodiments, the compositions include from about 51 wt. % to about 95 wt. % of the aqueous phase and from about 5 wt. % to about 49 wt. % of the non-aqueous phase. In other embodiments, the compositions include from about 55 wt. % to about 95 wt. % of the aqueous phase and from about 5 wt. % to and about 45 wt. % of the non-aqueous phase. In other embodiments, the compositions include from about 60 wt. % to about 95 wt. % of the aqueous phase and from about 5 wt. % to and about 40 wt. % of the non-aqueous phase. In other embodiments, the compositions include from about 65 wt. % to about 95 wt. % of the aqueous phase and from about 5 wt. % to and about 35 wt. % of the non-aqueous phase. In other embodiments, the compositions include from about 75 wt. % to about 95 wt. % of the aqueous phase and from about 5 wt. % to about 25 wt. % of the non-aqueous phase.

Embodiments of the present disclosure broadly relate to reusable fluid compositions including (a) an aqueous continuous phase including an additive composition to change certain properties of the aqueous continuous phase, where the additive composition comprises amphoteric polymers, salts up to saturation, polyacrylamides, and mixtures or combinations thereof, and (b) an organic internal phase including glycerols, polyglycerols, poly hydroxyl alcohols, monosaccharide derivatives, polysaccharide derivatives, or mixtures and combinations thereof, where the organic internal phase forms an osmotic membrane within the continuous aqueous phase and where the osmotic membrane allows hydration-dehydration mechanisms to be in place and control interactions between formation and fluid. In other embodiments, the additive composition includes hydratable polymers. In other embodiments, the additive composition includes a humalite product, high molecular weight xanthan gum and/or a complex mixture of natural polysaccharides, high-quality, low-viscosity, sodium salt of carboxymethyl celluloses, polyanionic cellulose, glycol-based anti-foaming agents, white calcium carbonate, barium sulfate mineral, and/or shale inhibitor. Humalite may be described as a natural derivative from sub-bituminous coal, containing substances such as humic acid, fulvic acid and/or humin. In other embodiments, the compositions have a density between about 8.6 ppg and about 20 ppg. In other embodiments, the compositions have a density between about 8.6 ppg and about 18 ppg. In other embodiments, the aqueous phase is present in an amount between about 51 wt. % and about 95 wt. % and the non-aqueous phase is present in an amount between about 5 wt. % and about 49 wt. %. In other embodiments, the aqueous phase is present in an amount between about 55 wt. % and about 95 wt. % and the non-aqueous phase is present in an amount between about 5 wt. % and about 45 wt. %. In other embodiments, the aqueous phase is present in an amount between about 65 wt. % and about 95 wt. % and the non-aqueous phase is present in an amount between about 5 wt. % and about 35 wt. %. In other embodiments, the aqueous phase comprises a brine. In other embodiments, the brine comprises a fresh water brine formed by adding the salts to fresh water.

Embodiments of the present disclosure broadly relates to reusable drilling fluid compositions including (a) an aqueous continuous phase including an additive composition to change certain properties of the aqueous continuous phase, where the additive composition includes amphoteric polymers, salts up to saturation, polyacrylamides, or mixtures and combinations thereof, and (b) an organic internal phase including glycerols, polyglycerols, poly hydroxyl alcohols, monosaccharide derivatives, polysaccharide derivatives, or mixtures and combinations thereof, where the organic internal phase creates an osmotic membrane within the continuous aqueous phase and where the osmotic membrane allows hydration-dehydration mechanisms to be in place and control interactions between formation and fluid. In certain embodiments, the compositions have a density between about 8.6 ppg and about 20 ppg. In other embodiments, the compositions have a density between about 8.6 ppg and about 18 ppg. In other embodiments, the aqueous phase is present in an amount between about 51 wt. % and about 95 wt. % and the non-aqueous phase is present in an amount between about 5 wt. % and about 49 wt. %. In other embodiments, the aqueous phase is present in an amount between about 55 wt. % and about 95 wt. % and the non-aqueous phase is present in an amount between about 5 wt. % and about 45 wt. %. In other embodiments, the aqueous phase is present in an amount between about 65 wt. % and about 95 wt. % and the non-aqueous phase is present in an amount between about 5 wt. % and about 35 wt. %. In other embodiments, the aqueous phase comprises a brine. In other embodiments, the brine comprises a fresh water brine formed by adding the salts to fresh water.

Embodiments of the present disclosure broadly relates to methods for drilling a borehole including the step of (a) while drilling, circulating a fluid composition of the present disclosure. The fluid composition comprises (a) an aqueous continuous phase including an additive composition to change certain properties of the aqueous continuous phase, where the additive composition comprises amphoteric polymers, salts up to saturation, polyacrylamides or mixtures and combinations thereof, and (b) an organic internal phase including glycerols, polyglycerols, poly hydroxyl alcohols, monosaccharide derivatives, polysaccharide derivatives, or mixtures and combinations thereof, where the organic internal phase creates an osmotic membrane within the continuous aqueous phase, where the osmotic membrane allows hydration-dehydration mechanisms to be in place and control interactions between formation and fluid and where the drilling fluid composition is reusable and the fluid has improved lubricity and improved cutting lift properties. In certain embodiments, the compositions have a density between about 8.6 ppg and about 20 ppg. In other embodiments, the compositions have a density between about 8.6 ppg and about 18 ppg. In other embodiments, the aqueous phase is present in an amount between about 51 wt. % and about 95 wt. % and the non-aqueous phase is present in an amount between about 5 wt. % and about 49 wt. %. In other embodiments, the aqueous phase is present in an amount between about 55 wt. % and about 95 wt. % and the non-aqueous phase is present in an amount between about 5 wt. % and about 45 wt. %. In other embodiments, the aqueous phase is present in an amount between about 65 wt. % and about 95 wt. % and the non-aqueous phase is present in an amount between about 5 wt. % and about 35 wt. %. In other embodiments, the aqueous phase comprises a brine. In other embodiments, the brine comprises a fresh water brine formed by adding the salts to fresh water.

Suitable Reagents

Suitable non-aqueous phase compositions include, without limitation, polyglycerol blends. Exemplary examples include a specific commercial mixture of mono, di, and triglycerins or a polyglycerol blend such as Oxi-Cure products from Cargill, Incorporated including Oxi-Cure 500 bearing CAS #25618-55-7 with synonymous products including glycerol homopolymers, glycerol polymers, polyglycerols, and/or 1,2,3-propanetriol homopolymers. One polyglycerol blend used in the compositions of the present disclosure had the following specification:

| Structure | HO(CH$_2$CH(OH)CH$_2$O)$_n$H |
| Structure | HO(CH$_2$ CH(CH$_2$OH)O)$_n$H |
| Mol. Formula | HO(C$_3$H$_6$O$_2$)$_n$H |
| Test | Specification |
| Appearance | Pale yellow sticky liquid |
| Water | ≤1% |
| Viscosity | ~41 Pa · s (dynamic) |
| Assay (glpc) | |
|    Triglycerol | From 35 wt. % to 55 wt. % |
|    Diglycerol | from 15 wt. % to 30 wt. % |
|    Tetraglycerol | from 10 wt. % to 25 wt. % |
|    Pentaglycerol | less than or equal to (≤) 10 wt. % |
|    Higher oligomers | less than or equal to (≤) 5 wt. % |
| RI, $\eta D^{20° C.}$ | 1.491 @ 25° C. |
| Heavy metals | less than (<) 10 ppm |
| As | less than (<) 3 ppm |
| Chloride | less than (<) 0.1% |

Suitable aqueous phase compositions include, without limitation, sodium brines, potassium brines, calcium brines, other brines, or mixtures and combinations thereof. The brines are made by adding sodium, potassium, and/or calcium salts to water up to saturation. Exemplary examples of sodium, potassium, and/or calcium salts include NaCl, KCl, CaCl$_2$, and/or equivalent sodium, potassium and/or calcium salts.

Suitable polyols, monosaccharides, and/or polysaccharides include, without limitation, six carbon sugars and their derivatives (e.g., allose, altrose, glucose, mannose, gulose, idose, galactose, talose, and cyclic hemiacetals or other derivatives), sorbitol, sorbitan, agar, agarose, alginic acid, alguronic acid, alpha glucan, amylopectin, amylose, arabinoxylan, beta-glucan, biocell collagen, callose, capsulan, carrageenan, cellodextrin, cellulin, cellulose, chitin, chitin nanofibril, chitosan, chrysolaminarin, curdlan, cyclodextrin, deae-sepharose, dextran, dextrin, exopolysaccharide, alpha-cyclodextrin, ficoll, fructan, fucoidan, galactoglucomannan, galactomannan, gellan gum, glucan, glucomannan, glucuronoxylan, glycocalyx, glycogen, hemicellulose, homopolysaccharide, hypromellose, icodextrin, inulin, kefiran, laminarin, lentinan, levan polysaccharide, lichenin, matrixdb, mixed-linkage glucan, mucilage, natural gum, oxidized cellulose, paramylon, pectic acid, pectin, pentastarch, pleuran, polydextrose, polysaccharide peptide, porphyran, pullulan, schizophyllan, selective relaxant binding agent, sepharose, sinistrin, sizofiran, sugammadex, unhydrolysable glucose polymers, welan gum, xanthan gum, xylan, xyloglucan, zymosan or mixtures or combinations thereof.

Suitable hydratable polymers that may be used in embodiments of the present disclosure include any of the hydratable polysaccharides which are capable of forming a gel in the presence of a crosslinking agent. For instance, suitable hydratable polysaccharides include, but are not limited to, xanthan gums, galactomannan gums, glucomannan gums, guars, derived guars, and cellulose derivatives. Specific examples are guar gum, guar gum derivatives, locust bean gum, Karaya gum, carboxymethyl cellulose, carboxymethyl hydroxyethyl cellulose, and hydroxyethyl cellulose. Exemplary examples include, but are not limited to, guar gums, hydroxypropyl guar, carboxymethyl hydroxypropyl guar, carboxymethyl guar, and carboxymethyl hydroxyethyl cellulose. Suitable hydratable polymers may also include synthetic polymers, such as polyvinyl alcohol, polyacrylamides, poly-2-amino-2-methyl propane sulfonic acid, and various other synthetic polymers and copolymers. The hydratable polymer may be present in the fluid in concentrations ranging from about 0.10% to about 5.0% by weight of the aqueous fluid. A preferred range for the hydratable polymer is about 0.20% to about 0.80% by weight.

Suitable amphoteric polymers include, without limitation, branched and/or cross-linked associative amphoteric polymers. The usable branching agents (cross-linking agents) are N-methylol acrylamide, methylene bis acrylamide, allyl ethers of sucrose, diacrylates, divinyls and all other multi-function compounds which can cause branching. One could also use one of the known branching agents for diallylated compounds such as methyl triallyl ammonium chloride, triallylamine, tetraallyl ammonium chloride, tetra allyl oxyethane, tetra allyl ethylene diamine and, more generally, all polyallylated compounds. It is also possible to make post-cross-linked polymers, for example by amidation reaction, esterification reaction, gamma ray treatment, etc.

An example of an amphoteric polymer is described in U.S. Pat. No. 7,700,702 B2. An example of such amphoteric polymer may comprise at least one acrylamide-derived cationic monomer containing a hydrophobic chain and with the general formula:

where: $R^1$, $R^2$, $R^3$, $R^4$, $R^5$, and $R^6$ are independently, a hydrogen or an alkyl chain containing 1 to 4, carbons, Q is an alkyl chain containing 1 to 8 carbons, $R^7$ is an alkyl or arylalkyl chain containing 8 to 30 carbons, X is a halide selected from the group including bromide, chloride, iodide, fluoride or a counterion with a negative charge;

between 1 and 99.9 mole % of at least one anionic monomer, and between 1 and 99 mole % at least one non-ionic hydrosoluble monomer.

The anionic monomers can be selected from a wide group. These monomers may present acrylic, vinyl, maleic, fumaric or allyl functionalities and may contain a carboxy, phosphonate, sulfonate or other group with an anionic charge, or the ammonium salt or alkaline-earth metal salt or alkaline metal salt corresponding to such a monomer. Examples of suitable monomers include acrylic acid, methacrylic acid, itaconic acid, crotonic acid, maleic acid, fumaric acid and strong-acid monomers, for example with a sulfonic or phosphonic acid-type function such as 2-acrylamido-2-methylpropane sulfonic acid, vinylsulfonic acid, vinylphosphonic acid, allylsulfonic acid, allylphosphonic acid, styrene sulfonic acid and their water-soluble salts of an alkali metal, alkaline-earth metal and ammonium.

The at least one non-ionic hydrosoluble monomer can be selected from the group including water-soluble vinyl monomers. In certain embodiments, the monomers belonging to this category are advantageously selected from the group including acrylamide and methacrylamide, N-isopropylacrylamide, N,N-dimethylacrylamide and N-methylolacrylamide. N-vinylformamide, N-vinyl acetamide, N-vinylpyridine and/or N-vinylpyrrolidone can also be used. Acrylamide may be the preferred non-ionic monomer.

Other amphoteric polymers include polymers having between 0.005 and 10 mole % hydrophobic cationic monomers, between 5 and 90 mole % of at least one anionic monomer, advantageously acrylic acid and/or methacrylic acid and/or 2-acrylamido-2-methylpropane sulfonic acid and their salts; and between 5 and 90 mole % of at least one hydrosoluble non-ionic monomer, advantageously acrylamide and/or methacrylamide and/or N-isopropylacrylamide and/or N,N-dimethylacrylamide and/or N-vinylformamide and/or N-vinyl acetamide and/or N-vinylpyrrolidone. Other polymers contain between 0.01 and 5 mole % of hydrophobic monomers and between 10 and 60 mole % of an anionic monomer and between 35 and 90 mole % of a non-ionic monomer. Other polymers contain between 0.02 and 2 mole % of hydrophobic monomers and between 10 and 50 mole % of an anionic monomer: acrylic acid, methacrylic acid and/or 2-acrylamido-2-methylpropane sulfonic acid and their salts, and between 48 and 90 mole % of a non-ionic monomer: acrylamide and/or methacrylamide and/or N-isopropylacrylamide and/or N,N-dimethylacrylamide and/or N-vinylformamide and/or N-vinyl acetamide and/or N-vinylpyrrolidone. Other polymers include acrylamide-derived hydrophobic cationic monomers preferred for the present disclosure are N-acrylamidopropyl-N,N-dimethyl-N-dodeyl ammonium chloride (DMAPA Cl($C_{12}$)), N-methacrylamidopropyl-N,N-dimethyl-N-dodecyl ammonium chloride (DMAPMA Cl($C_{12}$)), N-acrylamidopropyl-N,N-dimethyl-N-dodecyl ammonium bromide (DMAPA Br($C_{12}$)), N-methacrylamidopropyl-N,N-dimethyl-N-dodecyl ammonium bromide (DMAPMA Br($C_{12}$)), N-acrylamidopropyl-N,N-dimethyl-N-octadecyl ammonium chloride (DMAPA Cl($C_{18}$)), N-methacrylamidopropyl-N,N-dimethyl-N-octadecyl ammonium chloride (DMAPMA Cl($C_{18}$)), N-acrylamidopropyl-N,N-dimethyl-N-octadecyl ammonium bromide (DMAPA Br($C_{18}$)), N-methacrylamidopropyl-N,N-dimethyl-N-octadecyl ammonium bromide (DMAPMA Br($C_{18}$)).

Suitable silicates that may be used in the fluids of the present disclosure include, without limitation, hydrated or anhydrous silicate minerals with a layered structure and include, for example, alumino-silicate clays such as kaolins including hallyosite, smectites including montmorillonite, illite, and the like. Exemplary silicates include those marketed under the tradename CLOISITE® marketed by Southern Clay Additives, Inc. In an embodiment, silicates are exfoliated to separate individual sheets, or are non-exfoliated. Other silicates of similar structure can also be included such as, for example, talc, micas including muscovite, phlogopite, or phengite, or the like.

EXPERIMENTS

Example 1

This example illustrates the preparation of reusable high performance water based drilling fluid having a density of 10 ppg.

18.0 wt. % of sorbitol powder was dissolved in 23.3 wt. % deionized water. The resulting aqueous solution was then mixed into 56.7 wt. % of a polyglycerol blend such as Oxi-Cure 500 and mixing was continued until fluid was completely blended. To this fluid, 2.0 wt. % of a 50 wt. % KOH solution (1.0% equivalent KOH) was added. The KOH was added to the 13.1 wt. % NaCl brine, then pre-solubilize the 10 ppb HUMALITE in the aqueous mixture. The resulting polyglycerol blend was used successfully at a 14% concentration level in 10 ppg and 12 ppg formulations of a 13.1% by weight NaCl water-base system. The initial pH was 12.34 at 72.2° F. The pH after 30 days was 11.22 at 71.0° F. The pH after 71 days was 9.84 at 71.0° F.

The neat composition of Example 1 was a viscous liquid and had a brownish amber color, a specific gravity between 1.23 and 1.28, a density in pounds per gallon (ppg) between 10.26 ppg and 10.68 ppg, a flash point >392° F. (>200° C.), a pH between 9.5 and 10.5, mild odor, and freeze point <−36.4° F. (<−38° C.).

TABLE 1

Composition of the Example 1

| FORMULATION | SP. GR. | GRAMS | WT. % |
|---|---|---|---|
| Aqueous Component | | | 86.00 |
| 13.1 wt. % NaCl brine, ppb | 1.09 | 297.52 | |
| KOH, ppb | 2.06 | 1.50 | |
| WRD-6003, ppb | 1.30 | 1.50 | |
| Wel-Zan D, ppb | 1.55 | 1.50 | |
| Wel-Pac LV, ppb | 1.60 | 4.00 | |
| Wel-Defoam G, ppb | | 2 drops | |
| ExCAL CW 325 ppb | 2.70 | 20.00 | |
| Barite, ppb | 4.20 | 10.70 | |
| KCl, ppb | 1.98 | 14.00 | |
| Wel-Hib NPH, ppb | 1.07 | 8.00 | |
| Non-Aqueous Component | | | 14.00 |
| Polyglycerol blend* | 1.26 | 53.81 | |
| Total Weight (g) | | 419.53 | |
| Total Volume (cc) | | 350.00 | |

TABLE 1-continued

Composition of the Example 1

| FORMULATION | SP. GR. | GRAMS | WT. % |
|---|---|---|---|
| WBM Weight (ppg) | | 10.00 | |
| SG | | 1.199 | |

WRD-6003 is a humalite product available from Canadian Humalite International Inc.

Wei-Zan™ D—high molecular weight xanthan gum, a complex mixture of natural polysaccharides available from Weatherford.

Wei-Pac™ LV—high-quality, low-viscosity, sodium salt of carboxymethyl cellulose-commonly referred to as polyanionic cellulose available from Weatherford.

Wel-Defoam™ G—a glycol-based anti-foaming agent formulated for use in polymer systems available from Weatherford.

EwxCal—white calcium carbonate 325 mesh available SpecialChem

Barite—barium sulfate mineral

Wel-Hib NPH a shale inhibitor available from Weatherford.

Polyglycerol blend* was Oxi-cure 500 from Cargill, Inc.

TABLE 2

Example 1 Selected Properties

| Property | OFI# Rheology at 120° F. Before Hot Rolling | Cell# After Hot Rolling at 250° F. |
|---|---|---|
| 600 rmp | 98 | 92 |
| 300 rmp | 61 | 59 |
| 200 rmp | 47 | 45 |
| 100 rmp | 29 | 28 |
| 6 rmp | 4 | 5 |
| 3 rmp | 3 | 4 |
| 10" Second Gel | 2 | 4 |
| 10' Minute Gel | 3 | 5 |
| PV, cp | 37 | 33 |
| YP, lb/100 ft$^2$ | 24 | 26 |
| API Fluid Loss, mL | | 2.5 |
| HTHP Fluid Loss at 250° F., mL | | 13.6 |
| pH | 10.8 @ 68.5° F. | 9.25 @ 70.8° F. |
| Mud Weight, ppg | 10.09 | 10.01 |
| Specific Gravity | 1.21 | 1.20 |

Example 1 had a pH: 13.17 @ 68.8° F., a specific gravity of 1.24, and a brownish amber color. The freezing point of the composition was supposed to be −38° F. When the sample was left in the chiller for 24 hours at −38° F., the sample was very thick with very slow flow fluid, but was not frozen. When the sample was left for 48 hours at −38° F., the sample was still was very thick with very slow flow, but still not frozen. After sitting at room temperature for about 7 minutes to 8 minutes after being left in the chiller for 48 hours, the sample was back to flowing the same as the 0° F. After the sample was in the chiller for 24 hours at 0° F., the sample was normal. After the sample was in the chiller for 24 hours at −20° F., the sample was very thick and very slow flow.

Example 2

This example illustrates reusable high performance water based fluid having a density of 12.80 ppg. This fluid was prepared in accord with the preparation method of Example 1.

TABLE 4

Composition of the Example 2

| FORMULATION | SP. GR. | GRAMS | WT. % |
|---|---|---|---|
| Aqueous Component | | | 86.0 |
| 13.1 wt. % NaCl brine, ppb | 1.09 | 272.40 | |
| KOH, ppb | 2.06 | 1.00 | |
| WRD-6003, ppb | 1.30 | 10.00 | |
| Wel-Zan D, ppb | 1.55 | 0.75 | |
| Wel-Pac LV, ppb | 1.60 | 3.25 | |
| Wel-Defoam G, ppb | | 2 drops | |
| ExCAL CW 325 ppb | 2.70 | 20.00 | |
| Barite, ppb | 4.20 | 125.50 | |
| KCl, ppb | 1.98 | 14.00 | |
| Wel-Hib NPH, ppb | 1.07 | 8.00 | |
| Non-Aqueous Component | | | 14.00 |
| Polyglycerol blend* | 1.26 | 48.48 | |
| Total Weight (g) | | 503.38 | |
| Total Volume (cc) | | 350.00 | |
| WBM Weight (ppg) | | 12.00 | |
| SG | | 1.438 | |

WRD-6003 is a humalite product available from Canadian Humalite International Inc.

Wei-Zan™ D—high molecular weight xanthan gum, a complex mixture of natural polysaccharides available from Weatherford.

Wei-Pac™ LV—high-quality, low-viscosity, sodium salt of carboxymethyl cellulose-commonly referred to as polyanionic cellulose available from Weatherford.

Wel-Defoam™ G—a glycol-based anti-foaming agent formulated for use in polymer systems available from Weatherford.

EwxCal—white calcium carbonate 325 mesh available SpecialChem

Barite—barium sulfate mineral

Wel-Hib NPH a shale inhibitor available from Weatherford.

Polyglycerol blend* was Oxi-cure 500 from Cargill, Inc.

TABLE 5

Example 2 Selected Properties

| Property | OFI# Rheology at 120° F. Before Hot Rolling | Cell# After Hot Rolling at 250° F. |
|---|---|---|
| 600 rmp | 146 | 141 |
| 300 rmp | 98 | 94 |
| 200 rmp | 81 | 74 |
| 100 rmp | 51 | 48 |
| 6 rmp | 7 | 10 |
| 3 rmp | 6 | 7 |
| 10" Second Gel | 6 | 8 |
| 10' Minute Gel | 7 | 10 |
| PV, cp | 48 | 47 |
| YP, lb/100 ft$^2$ | 50 | 47 |
| API Fluid Loss, mL | #3 | 1.9 |
| HTHP Fluid Loss at 250° F., mL | | 15.2 |
| pH | 10.3 @ 74° F. | 8.45 @ 72° F. |
| Mud Weight, ppg | 12.18 | 12.01 |
| Specific Gravity | 1.46 | 1.44 |

All documents described herein are incorporated by reference herein, including any priority documents and/or testing procedures to the extent they are not inconsistent with this text. Further, all documents and references cited herein, including testing procedures, publications, patents, journal articles, etc. are herein fully incorporated by reference for all jurisdictions in which such incorporation is permitted and to the extent such disclosure is consistent with the description of the present disclosure. As is apparent from the foregoing general description and the specific embodiments, while forms of the embodiments have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "I" preceding the recitation of the composition, element, or elements and vice versa, e.g., the terms "comprising," "consisting essentially of," "consisting of" also include the product of the combinations of elements listed after the term.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

We claim:

1. A method for drilling a borehole, comprising:
   while drilling, circulating a fluid composition comprising:
   an aqueous continuous phase comprising an additive composition, the additive composition comprising an amphoteric polymer, a polyacrylamide, or a combination thereof; and
   an organic internal phase comprising a glycerol, a polyglycerol or a combination thereof.

2. The method of claim 1, wherein the organic internal phase further comprises a poly hydroxyl alcohol, a monosaccharide derivative, or a combination thereof.

3. The method of claim 1, wherein the fluid composition has a density between about 8.6 ppg and about 20 ppg, the aqueous continuous phase is present in an amount between about 51 wt. % and about 95 wt. %, and the organic internal phase is present in an amount between about 5 wt. % and about 49 wt. %.

4. The method of claim 1, wherein the fluid composition has a density between about 8.6 ppg and about 16 ppg, the aqueous continuous phase is present in an amount between about 55 wt. % and about 95 wt. %, and the organic internal phase is present in an amount between about 5 wt. % and about 45 wt. %.

5. The method of claim 1, wherein the fluid composition has a density between about 8.6 ppg and about 14 ppg, the aqueous continuous phase is present in an amount between about 65 wt. % and about 95 wt. %, and the organic internal phase is present in an amount between about 5 wt. % and about 35 wt. %.

6. The method of claim 1, wherein the aqueous continuous phase further comprises a brine, the brine comprises a salt, and the salt comprises a sodium salt, a potassium salt, a calcium salt, or a combination thereof.

7. The method of claim 6, wherein the brine comprises a fresh water brine and wherein the salt comprises NaCl, KCl, CaCl$_2$), an equivalent salt, or a combination thereof.

8. A method for drilling a borehole, comprising:
   while drilling, circulating a fluid composition comprising:
   an aqueous continuous phase comprising an additive composition, the additive composition comprising a salt up to saturation and at least one of an amphoteric polymer or a polyacrylamide; and
   an organic internal phase comprising a glycerol, a polyglycerol, or a combination thereof.

9. The method of claim 8, wherein the organic internal phase further comprises a poly hydroxyl alcohol, a monosaccharide derivative, or a combination thereof.

10. The method of claim 8, wherein the fluid composition has a density between about 8.6 ppg and about 20 ppg, the aqueous continuous phase is present in an amount between about 51 wt. % and about 95 wt. %, and the organic internal phase is present in an amount between about 5 wt. % and about 49 wt. %.

11. The method of claim 8, wherein the fluid composition has a density between about 8.6 ppg and about 16 ppg, the aqueous continuous phase is present in an amount between about 55 wt. % and about 95 wt. %, and the organic internal phase is present in an amount between about 5 wt. % and about 45 wt. %.

12. The method of claim 8, wherein the fluid composition has a density between about 8.6 ppg and about 14 ppg, the aqueous continuous phase is present in an amount between about 65 wt. % and about 95 wt. %, and the organic internal phase is present in an amount between about 5 wt. % and about 35 wt. %.

13. The method of claim 8, wherein the salt comprises a sodium salt, a potassium salt, a calcium salt, or a combination thereof.

14. The method of claim 13, wherein the salt comprises NaCl, KCl, CaCl$_2$), an equivalent salt, or a combination thereof.

15. A method for drilling a borehole, comprising:
   while drilling, circulating a fluid composition comprising:
   an aqueous continuous phase comprising an additive composition, the additive composition comprising a salt up to saturation, a hydratable polymer, and an amphoteric polymer; and
   an organic internal phase comprising a glycerol, a polyglycerol, or a combination thereof.

16. The method of claim 15, wherein the organic internal phase further comprises a poly hydroxyl alcohol, a monosaccharide derivative, or a combination thereof.

17. The method of claim 15, wherein the salt is a potassium salt, a sodium salt, or a combination thereof.

18. The method of claim 15, wherein the fluid composition has a density between about 8.6 ppg and about 20 ppg, the aqueous continuous phase is present in an amount between about 51 wt. % and about 95 wt. %, and the organic internal phase is present in an amount between about 5 wt. % and about 49 wt. %.

19. The method of claim 15, wherein the fluid composition has a density between about 8.6 ppg and about 16 ppg, the aqueous continuous phase is present in an amount between about 55 wt. % and about 95 wt. %, and the organic internal phase is present in an amount between about 5 wt. % and about 45 wt. %.

20. The method of claim 15, wherein the fluid composition has a density between about 8.6 ppg and about 14 ppg, the aqueous continuous phase is present in an amount between about 65 wt. % and about 95 wt. %, and the organic internal phase is present in an amount between about 5 wt. % and about 35 wt. %.

* * * * *